United States Patent Office 2,961,451
Patented Nov. 22, 1960

2,961,451
PROCESS FOR MAKING AMPHOTERIC SURFACE ACTIVE AGENTS

Allen Keough, Nixon, N.J., assignor to Johnson & Johnson, a corporation of New Jersey No Drawing. Filed Feb. 11, 1957, Ser. No. 639,224

9 Claims. (Cl. 260—404.5)

This invention relates to the art of making amphoteric surface active agents and, more particularly, to an improved process for making amphoteric surface active agents of the type

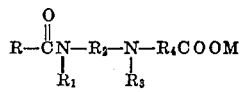

These products are formed by the reaction of amines of the type

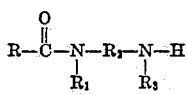

with monohalo carboxylic acids, particularly monochloroacetic acid, wherein R is an aliphatic hydrocarbon radical of 9–17 carbon atoms, and preferably 11 carbon atoms; $R_1$ is hydrogen or an aliphatic hydrocarbon or alkylol group having 2–4 carbon atoms; $R_2$ is an alkylene radical having 2–4 carbon atoms, and preferentially represented by —$CH_2$—$CH_2$—; $R_3$ is an alkylol radical of 2–4 carbon atoms, preferably —$CH_2$—$CH_2OH$; $R_4$ is an aliphatic hydrocarbon having 1–4 carbon atoms, preferably —$CH_2$—; and M is hydrogen, sodium or potassium.

The alkylation of nitrogen bases with monochloroacetic acid appears to be well known in the art, but it also appears that little attention has been paid to the optimum conditions under which monochloroacetic acid reacts without appreciable decomposition in aqueous solution to ensure maximum conversion of an amine to an amino acid.

It has been shown that monochloroacetic acid undergoes constant decomposition in aqueous solution regardless of the pH, and the rate of decomposition is nearly exponential at high pH and about 50° C. (See L. F. Behrenke and E. C. Britton, Ind. Eng. Chem. 38, 544 (1946).

Where the particular amine to be alkylated is of low molecular weight, and water soluble, the problem of the decomposition of the chloroacetic acid or, more specifically, its sodium or potassium salt is minimized since the reaction mixture is homogeneous, and can be maintained at a suitable low temperature. The preparation of methyl iminodiacetic acid ($CH_3$—N—($CH_2COOH$)$_2$) from methylamine ($CH_3NH_2$) and sodium chloroacetate ($ClCH_2COONa$) is a typical example of the above conditions and good yields are obtained as described by G. J. Berchet in Org. Syntheses, Coll. vol. II, John Wiley and Sons, Inc., N.Y., 1943; p. 397.

However, when it is desired that the product be an amphoteric surface active material, the high molecular weight amine starting material of the type described above is generally insoluble in water at low temperatures, but dispersible at suitably higher temperatures. It is not surprising then to find that simple heating of an amine of the type described above with monochloroacetic acid, as disclosed by Australian Convention Application Serial No. 10755, filed July 20, 1955, by Ciba, Limited, leads to a water soluble product of low amino acid content due to insufficient "acid binding" material, such as sodium hydroxide, which helps to drive the reaction to completion.

Similarly, addition of these amines, or their simpler structural analogs, to a neutralized monochloroacetic solution, followed by heating and addition of caustic, results in a low conversion to the desired amphoteric product because of the high rate of decomposition of the sodium chloroacetate. (See Schoeller et al., 2,103,872.)

Also, Stein et al., J. Am. Chem. Soc. 77, 191 (1955), reported the alkylation of long chain primary amines with sodium chloroacetate where aqueous-alcohol solvent was used to solubilize the amine, in order to conduct the reaction at low temperatures. Again, the yields were low, and the presence of alcohol is often undesirable, and costly.

It is therefore an object of this invention to provide an improved process for making amphoteric surface active agents.

It is another object to react amines of limited water solubility, having at least one hydrogen atom attached to the amino nitrogen atom, with sodium chloroacetate to form amphoteric surface active agents.

It is a further object to secure high yields (80–90%) of amphoteric materials.

The process of this invention requires that the amine be mixed with water, preferably at least an equal weight of water, at a suitable temperature, and neutralized to a pH of 7–9. Freshly prepared sodium chloroacetate solution is added slowly, preferably dropwise, to the amine so that the sodium chloroacetate will react with the amine, without being subjected for long periods to the temperature and alkalinity of the reaction medium. Some alkalinity of the reaction medium is desirable to accelerate the alkylation reaction by removal of the hydrogen chlorine formed.

Chloroacetic acid, preferably a molar excess of at least 25%, must be neutralized with an alkali, such as sodium hydroxide, at a temperature below about 50° C., to avoid hydrolysis to glycolic acid, before the slow addition of the resulting sodium chloroacetate solution to the amine. In this way, the pH of the reaction medium is maintained slightly alkaline throughout the course of the reaction to minimize the decomposition of sodium chloroacetate.

Furthermore, the above-described amphoteric surface active agents can be conveniently isolated as their barium salts.

With the above and other objects in view, which will be apparent as the description proceeds, I have set forth my invention herein and have illustrated it in the example, which is set forth by way of illustration and not as a limitation. Parts are by weight unless indicated otherwise.

Example 93.4 parts (0.322 mole) of recrystallized N-lauroyl-N'-(2-hydroxyethyl) ethylenediamine (M.P. 94.0–96.5° C. uncorr.) and 300 parts of distilled water were placed in a round-bottom, 3-necked flask equipped with stirrer, thermometer and dropping funnel. The mixture was heated to about 77° C. with vigorous stirring, and the dispersed mass was then neutralized with a dilute aqueous solution containing 0.693 part (0.019 mole) of hydrochloric acid. In a separate container, 38.9 parts (0.403 mole) of chloroacetic acid in 50 parts of water was neutralized slowly to pH 6.9 with 53 parts (0.405 mole) of 30.6% sodium hydroxide solution, care being taken to prevent the temperature from exceeding 50° C. About 200 parts of water was added to the amine slurry and then the sodium chloroacetate solution was added to it over a period of 3.5 hours at a temperature of 70±3° C. At the end of the addition, 55.2 parts (0.422 mole) of 30.6% sodium hydroxide solution was slowly added over a one-hour period, and the mixture was then heated for three hours at 70±3° C. The yield was 86% of the theoretical amount of N-lauroyl-N'-carboxymethyl-N'-(2-hydroxyethyl) ethylenediamine, isolated as its barium salt, as described below.

A 100.1 part sample was diluted with 39.6 parts of methanol, and the resulting solution was stirred with 5.5 parts of barium chloride dihydrate in 50 parts of distilled water. The white gelatinous precipitate which formed was filtered off with suction, and dried. The product had an M.P. of 153–160° C., and weighed 15.6 parts or an 86% yield of the theoretical amount of barium di-[N-lauroyl-N'-carboxymethyl-N'-(2-hydroxyethyl) ethylenediamine] which, when recrystallized twice from methanol, had an M.P. of 171.5–172.5° C.

*Analysis.*—Calc. for $C_{36}H_{70}N_2O_4Ba$: C, 52.45; H, 8.56; Ba, 16.66. Found: C, 52.36; H, 8.66; Ba, 16.68.

The amphoteric compound, substantially free of barium can be obtained by treatment of the barium salt with an equimolecular amount of sulfuric acid followed by removal of the insoluble barium sulfate by filtration.

The amount of water used in this process can be less than the weight of the amine, with some reduction in the high yield, but as much as 500% weight excess does not materially decrease the high conversion. In the preferred embodiment, the amount of water present consistent with good mixing generally amounts to at least double the weight of the starting amine component.

A 25–50% molar excess of sodium chloroacetate gives the most desirable results in terms of conversion to the desired product, but useful surface active solutions can be prepared with as little as one mole or as much as 2 moles of sodium chloroacetate.

The reaction may be carried out at a temperature range of 60–100° C., although I prefer 70° C.

Although the above example is limited to a process of securing high yields of a N-lauroyl-N'-carboxymethyl-N'-(2-hydroxyethyl) ethylenediamine, similar results are obtained when N-caproyl-N'-(2-hydroxyethyl) ethylenediamine is treated similarly to secure a high yield of N-caproyl-N'-carboxymethyl-N'-(2-hydroxyethyl) ethylenediamine, or when recrystallized N-myristoyl-N'-(2-hydroxyethyl) ethylenediamine is treated in a similar way to secure high yields of N-myristoyl-N'-carboxymethyl-N'-(2-hydroxyethyl) ethylenediamine.

Similar results are obtained by this process using other aliphatic amino compounds within the scope of the general formula set forth above.

Suitable amino compounds for use in the process of this invention, such as

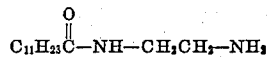

and

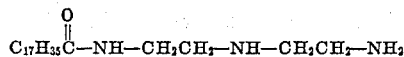

have been discussed in U.S. Patent 2,344,260.

Furthermore, although the example and the discussion immediately preceding this paragraph is directed to the operation of a process using an amino amide as the starting material, other amines of the type R'—NH$_2$, where R' is a 12–18 carbon alkyl radical, such as tetradecylamine, may be substituted for the polyamine derivative described above.

The products prepared by the processes disclosed herein are particularly useful as shampoos, or when formulated into other types of shampoos by combination with other surfactants, foam boosters, and conditioning agents, e.g., as set forth in the copending application of J. N. Masci and N. A. Poirier, Serial Number 639,185, filed February 11, 1957.

It will therefore be apparent that I have developed a simple process for the production of amphoteric surface active agents in high yields, such as 80–90%.

It is apparent that many widely different embodiments of this invention may be made without departing from the spirit and scope thereof; and therefore, it is not intended to be limited except as indicated in the appended claims.

I claim:
1. The process of making amphoteric surface active agents of the type

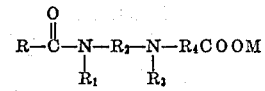

wherein R is an aliphatic hydrocarbon radical of 9–17 carbon atoms; $R_1$ is a member of the group consisting of hydrogen, aliphatic hydrocarbons having 2–4 carbon atoms, and alkylol groups having 2–4 carbon atoms; $R_2$ is an alkylene radical having 2–4 carbon atoms; $R_3$ is an alkylol radical of 2–4 carbon atoms; $R_4$ is an aliphatic hydrocarbon having 1–4 carbon atoms; and M is a member of the group consisting of hydrogen, sodium and potassium, which comprises adding a substantially pure amine of the type,

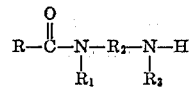

wherein R, $R_1$, $R_2$, and $R_3$ are as indicated above, and having an uncorrected melting range of about 2.5° C., with stirring to at least an equal weight of water, neutralizing the resulting mixture to a pH of 7–9 with hydrochloric acid, and slowly adding at least a 25% excess of an aqueous solution of a member of the group consisting of sodium chloroacetate, sodium chloropropionate, sodium chlorobutyrate, and sodium chlorovalerate to the aqueous amine, while keeping the temperature of the reaction mixture at 60–100° C, and heating for about 2 hours at about 67–73° C.

2. The process of claim 1, in which the amount of water is from 1–6 times the weight of the amine.

3. The process of claim 1, in which the amount of water is from 2–4 times the weight of the amine.

4. The process of claim 1, in which sodium chloroacetate is added in a molar excess of 25–50%.

5. The process of claim 1, in which the reaction is carried out at about 70° C.

6. The process of claim 1, in which sodium hydroxide solution is slowly added to the reaction mixture at a temperature of 60–100° C.

7. The process of making N-lauroyl-N'-carboxymethyl-N'-(2-hydroxyethyl) ethylenediamine in high yield, which comprises adding substantially pure N-lauroyl-N'-(2-hydroxyethyl) ethylenediamine, having an uncorrected melting range of about 2.5° C., with stirring to at least double its weight of water, neutralizing the resulting mixture to a pH of 7–9 with hydrochloric acid, slowly adding a molar excess of 25–50% of an aqueous sodium chloroacetate to the aqueous amine, while keeping the temperature of the reaction mixture at 60–100° C., slowly adding sodium hydroxide solution to the reaction mixture at 60–100° C., and heating at that temperature for about 3 hours.

8. The process of claim 7, in which the reaction is carried out at about 70° C.

9. The process of claim 8, in which the molar quantity of sodium chloroacetate is 1.25 times the molar quantity of the ethylenediamine derivative, and is added over a period of at least 3.5 hours, and the sodium hydroxide added to complete the reaction is approximately equivalent to the molar quantity of hydrochloric acid plus the molar quantity of sodium chloroacetate, and is added over a period of at least 1 hour, followed by heating at about 70° C. for about 3 hours, and the yield of amphoteric surface active agent is about 86% of the theoretical.

References Cited in the file of this patent

UNITED STATES PATENTS

| | | |
|---|---|---|
| 2,103,872 | Schoeller et al. | Dec. 28, 1937 |
| 2,781,376 | Mannheimer | Feb. 12, 1957 |

UNITED STATES PATENT OFFICE
CERTIFICATION OF CORRECTION

Patent No. 2,961,451                        November 22, 1960

Allen Keough

It is hereby certified that error appears in the above numbered patent requiring correction and that the said Letters Patent should read as corrected below.

Column 2, lines 30 and 31, for "chlorine" read -- chloride --.

Signed and sealed this 2nd day of May 1961.

(SEAL)
Attest:

ERNEST W. SWIDER
Attesting Officer

DAVID L. LADD
Commissioner of Patents